US008965934B2

(12) United States Patent
Prieditis (10) Patent No.: US 8,965,934 B2
(45) Date of Patent: Feb. 24, 2015

(54) METHOD AND APPARATUS FOR FACILITATING ANSWERING A QUERY ON A DATABASE

(75) Inventor: Armand Erik Prieditis, Mountain View, CA (US)

(73) Assignee: Quova, Inc., Mountain View, CA (US)

( * ) Notice: Subject to any disclaimer, the term of this patent is extended or adjusted under 35 U.S.C. 154(b) by 227 days.

(21) Appl. No.: 13/297,531

(22) Filed: Nov. 16, 2011

(65) Prior Publication Data

US 2013/0124502 A1 May 16, 2013

(51) Int. Cl.
*G06F 17/30* (2006.01)

(52) U.S. Cl.
CPC ............................. *G06F 17/30424* (2013.01)
USPC ........... 707/797; 707/758; 707/791; 707/792; 707/793; 707/798; 707/799; 707/800; 707/801; 707/802

(58) Field of Classification Search
USPC .................. 707/758, 791–793, 797–802, 707/999.102–999.107
See application file for complete search history.

(56) References Cited

U.S. PATENT DOCUMENTS

| 8,290,972 | B1 * | 10/2012 | Deshmukh et al. | 707/758 |
| 2011/0054901 | A1 * | 3/2011 | Qin et al. | 704/254 |
| 2012/0254251 | A1 * | 10/2012 | Barbosa et al. | 707/797 |

OTHER PUBLICATIONS

Muja, Marius, et al., "Fast Approximate Nearest Neighbors With Automatic Algorithm Configuration", International Conference on Computer Vision Theory and Applications VISAPP'09), (2009), 10 pgs.

* cited by examiner

*Primary Examiner* — Syling Yen
(74) *Attorney, Agent, or Firm* — Schwegman Lundberg & Woessner, P.A.

(57) ABSTRACT

A method and apparatus for facilitating answering a query on a database. Example embodiments include: accessing a database tree having a plurality of nodes; receiving a set of input variable values, a non-empty set of output variables, and information indicative of a node in the database tree; determining a traversal cost based on the node and the set of input variable values; determining a lower bound based on the node and the set of input variable values, wherein the lower bound corresponds to an upper-bound probability estimate based on one or more of the plurality of nodes and the set of input variable values; pruning one or more of the plurality of nodes based on the traversal cost, the lower bound, and a pruning bound; and returning a result including a non-empty set of output variable values based on the set of input variable values, the node, the traversal cost, and the lower bound.

18 Claims, 11 Drawing Sheets

```
┌─────────────────────────────┐
│   Processing Logic for      │
│ Answering a Query on a Database │
│           -900-             │
└─────────────────────────────┘
              │
              ▼
┌─────────────────────────────────────────────────┐
│ Access a database tree having a plurality of nodes. │
│                      -910-                      │
└─────────────────────────────────────────────────┘
              │
              ▼
┌─────────────────────────────────────────────────┐
│ Receive a set of input variable values, a non-empty set of output │
│  variables, and information indicative of a node in the database │
│                        tree.                    │
│                       -920-                     │
└─────────────────────────────────────────────────┘
              │
              ▼
┌─────────────────────────────────────────────────┐
│ Determine a traversal cost based on the node and the set of │
│                input variable values.           │
│                       -930-                     │
└─────────────────────────────────────────────────┘
              │
              ▼
┌─────────────────────────────────────────────────┐
│  Determine a lower bound based on the node and the set of │
│  input variable values, wherein the lower bound corresponds │
│  to an upper-bound probability estimate based on one or more │
│  of the plurality of nodes and the set of input variable values. │
│                       -940-                     │
└─────────────────────────────────────────────────┘
              │
              ▼
┌─────────────────────────────────────────────────┐
│  Prune one or more of the plurality of nodes based on the │
│   traversal cost, the lower bound, and a pruning bound.  │
│                       -950-                     │
└─────────────────────────────────────────────────┘
              │
              ▼
┌─────────────────────────────────────────────────┐
│  Return a result including a non-empty set of output variable │
│ values based on the set of input variable values, the node, the │
│       traversal cost, and the lower bound.       │
│                       -960-                     │
└─────────────────────────────────────────────────┘
              │
              ▼
          ( End )
```

METHOD AND APPARATUS FOR FACILITATING ANSWERING A QUERY ON A DATABASE

TECHNICAL FIELD

Various embodiments illustrated by way of example relate generally to the field of data processing and, more specifically, to a method and apparatus for facilitating answering a query on a database.

BACKGROUND

Previous approaches to answering a query on a database involve exhaustive search, space-partitioned search, pigeonholing, and hashing. Exhaustive search involves searching through the entire database to find those rows which "match" the query. Space-partitioned search involves searching through a database, which has been partitioned into a hierarchy of nodes for faster search. Space partitioning methods including kd-trees, metric trees, M-trees, R*-trees, vp-trees, vantage point trees, vantage point forests, multi-vantage point trees, bisector trees, Orchard's algorithm, random projections, fixed queries trees, Voronoi trees, BBD-trees, min-wise independent permutations, Burkhard-Keller trees, generalized hyper-plane trees, geometric near-neighbor access trees (GNAT), and spatial approximation trees (SAT). Pigeonholing involves putting each row into a bucket based on the row's contents. Hashing involves transforming the query into an index, which can then be used to determine those locations of the database to search. These conventional approaches have several shortcomings. Exhaustive search does not scale up as the database size grows. Space partitioning does not scale up as the number of dimensions of a row grows. This is because the number of partitions per node is typically 2n where n is the number of dimensions. Thus, when n is large, exhaustive search becomes more efficient than space-partitioned search. Pigeonholing suffers from boundary confusion because a query can be placed in one bucket when the query is actually closer to a row in another bucket. Hashing cannot directly be used to find a "nearest" match. Finally, these conventional approaches also cannot handle missing data nor can they extrapolate beyond or interpolate between rows in the database.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

According to an example embodiment, a method and apparatus for facilitating answering a query on a database is described. Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

Overview

According to various example embodiments described herein, the disclosed system and method solves the problem of answering a query on a database. The database can comprise one or more rows of information, where each row can be a vector, a matrix, or any other data structure. The query can correspond to a set of input variable values and a non-empty set of output variables of interest. Answering a query involves finding a set of rows that "match" the input variable values and returning the output variable values for each such "matching" row. The term "match" is used loosely here to mean both an exact match and an approximate or nearest match. Answering a query is important because it is a central operation on a database.

The various example embodiments solve the problem of answering a query on a database by using space-partitioned branch-and-bound search, where the space is partitioned as a probabilistic tree. The probabilistic tree comprises a set of nodes, where each node is associated with a probability distribution function corresponding to one or more rows in the database. For example, the probability distribution function might be a multivariate normal, comprising a mean vector and a covariance matrix. The mean vector represents typical values for a row and the covariance matrix represents deviation associated with pairs of those typical values. Other distributions might have different parameters. Each node can have zero or more children and is also associated with a probability of the node given the parent node. Each node can also have an identifier associated with it, which facilitates retrieval of that associated information.

The source data for a probability distribution function might be derived from the database or supplied by a human. For example, the mean might represent the average from the database. Similarly, the covariance matrix might represent the sample covariance from the database. The probability distribution can also be obtained from automated means, but hand-tuned. The probabilistic tree can be built using various methods. For example, the probabilistic tree can be formed by repeatedly splitting the database into subparts with various clustering methods such as Expectation-Maximization or k-means clustering. A salient aspect of the various embodiments described herein is that the source of the probabilistic tree is not important. That is, the various embodiments described herein solve the problem of answering a query by space-partitioned branch-and-bound search through an existing probabilistic tree; the creation of the probabilistic tree itself is not central to the various embodiments described herein.

The various example embodiments can determine a result based on a query, a current node in the probabilistic tree, and a current pruning bound. The query comprises a set of input variable values and a non-empty set of output variables. The result corresponds to a probability based on the set of input variable values and the node. One system embodiment can perform the following operations:

Determine whether or not the current node is a leaf node. If so:
  Determine a cost based on the current node and the set of input variable values, wherein the cost corresponds to a probability of the input variable values based on the node.
  Determine a non-empty set of output variable values based on the set of input variable values and the non-empty set of output variable values, wherein the non-empty set of output variable values corresponds to a most likely set of non-empty output variable values based on the set of input variable values.
  Return a result which indicates the cost and the output variable values.
If not:
  Determine a lower-bound estimate based on the node and the set of input variable values, wherein the lower-bound corresponds to an upper-bound probability estimate based on one or more of the nodes and the set of input variable values.
  Determine whether or not the lower-bound estimate exceeds the current pruning bound.
  If so: return a result which indicates the lower-bound estimate.
  If not:
    Determine a new pruning bound based on the current pruning bound and a cost of reaching at least one child node of the current node, wherein the cost of reaching the at least one child node corresponds to a probability of the child node based on the current node.
    Determine an intermediate result based on the set of input variable values, the non-empty set of output variables, the at least one child node, and the new pruning bound, wherein the intermediate result corresponds to a probability of the set of input variable values and the at least one child node.
    Determine a final result based on the intermediate result, wherein the final result corresponds to a probability of the set of input variable values and the current node.
    Return a result which indicates the final result.

Typically, this system can be driven by another method and apparatus which gradually increases the pruning bound until an answer to a query is found. Initially, the pruning bound is zero and the pruning bound can be updated to the result returned above and then the process repeated.

If the lower-bound is an accurate estimate (i.e., it is often close to the actual returned value at the node), an embodiment can prune large portions of the probabilistic tree. Experiments show that with a reasonable lower-bound local estimate, the resulting search complexity is a log of the size of the database. This functionality is beneficial for efficiently answering queries when the database (and corresponding probabilistic tree) is extremely large.

As described herein for various embodiments, the following advantages and benefits can be realized:

1. Various embodiments can be used to prune much of the probabilistic tree, thus facilitating answering queries in a large database, from which the probabilistic tree is built.
2. Various embodiments can guarantee that the most likely output variable values will not be pruned.
3. Various embodiments can facilitate extrapolation of the rows in the database while eliminating outliers.
4. Various embodiments can scale up as the number of columns increases and as database size increases. This is because the branching factor of each node in the tree is not a function of the number of variables and effective pruning can scale with database size.
5. Various embodiments produce beneficial results not provided in previous approaches.

The system of various embodiments can be used to answer queries efficiently in a large database. For example, the system can be used to answer queries involving geo-location, which may involve databases that are terabyte-sized. Additionally, various embodiments can be offered as a service, which also includes automatically building a probabilistic tree based on a provided database, securely hosting that probabilistic tree, and providing an efficient means for answering queries as described herein.

An example embodiment involves using a multivariate normal distribution at a node, which is characterized by a mean vector and a covariance matrix. Other example embodiment involve nodes with two children, a lower-bound function based on the minimum sum of the path cost to each leaf node, a lower-bound function based on the mean, and the minimum (min), and maximum (max) values for each input variable at a node. Non-probabilistic trees could be used, but they don't scale up in terms of the number of columns of input. Other uses include content-based image retrieval, DNA sequencing, traceroute analysis, data compression, recommendation systems, internet marketing, classification and prediction, cluster analysis, plagiarism detection, and the like. In content-based image retrieval, the query might correspond to a particular set of red, green, and blue pixel values of a desired image. When the database contains billions of images, each with millions of pixels, answering such a query can be difficult without the benefits of the various embodiments described herein.

DETAILED DESCRIPTION OF AN EXAMPLE EMBODIMENT

Figure 1:
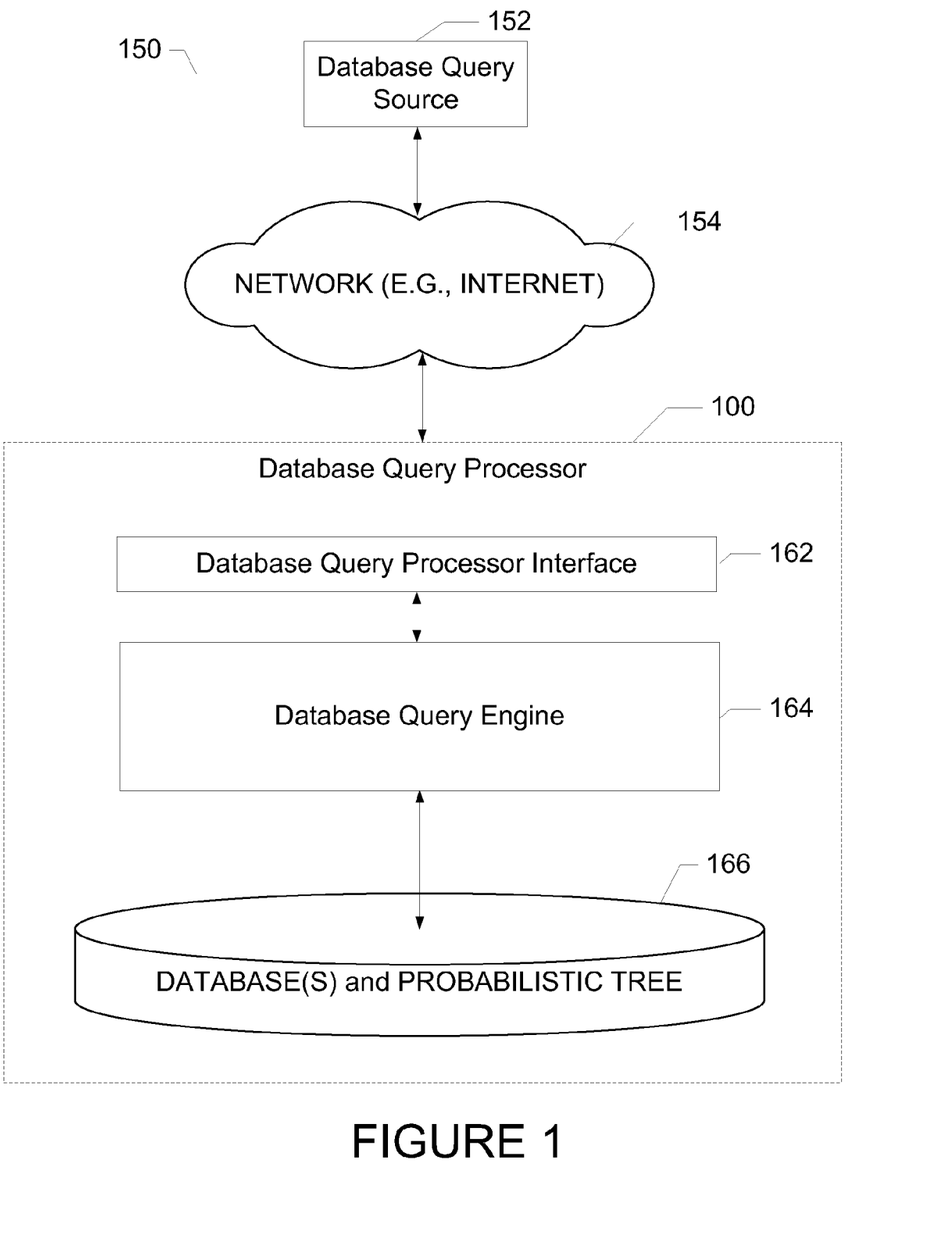
FIG. 1 illustrates a network diagram depicting a system having a database query source in network communication with a database query processor and a database via a data network, according to an example embodiment.

FIG. 1 illustrates a network diagram depicting a system 150 having a database query source 152 in network communication with a database query processor 100 and a database 166 via a data network 154, according to an example embodiment. Database query source 152 represents any computing entity, which may originate a query on a database, such as database 166. Database query source 152 can include a client system, a server system, an automated service, an autonomous network, or the like. Database query source 152 can also be a computing entity that is directly connected to the database query processor 100 and/or database 166 without the use of a data network.

The database 166 can be any conventional type of data repository. Additionally, the database 166 can be configured to include a probabilistic tree. The probabilistic tree can comprise a set of nodes, where each node is associated with a probability distribution function corresponding to one or more rows in the database. For example, the probability distribution function might be a multivariate normal, comprising a mean vector and a covariance matrix. The mean vector represents typical values for a row and the covariance matrix represents deviation associated with pairs of those typical values. Other distributions might have different parameters. Each node can have zero or more children and is also associated with a probability of the node given the parent node. Each node can also have an identifier associated with it, which facilitates retrieval of that associated information. The probabilistic tree for various embodiments can be built using various conventional methods as described above. As described in more detail herein, various embodiments, implemented by the processing performed by the database query processor 100, provide a method and apparatus for facilitating answering a query on a database, such as database 166.

Figure 2:
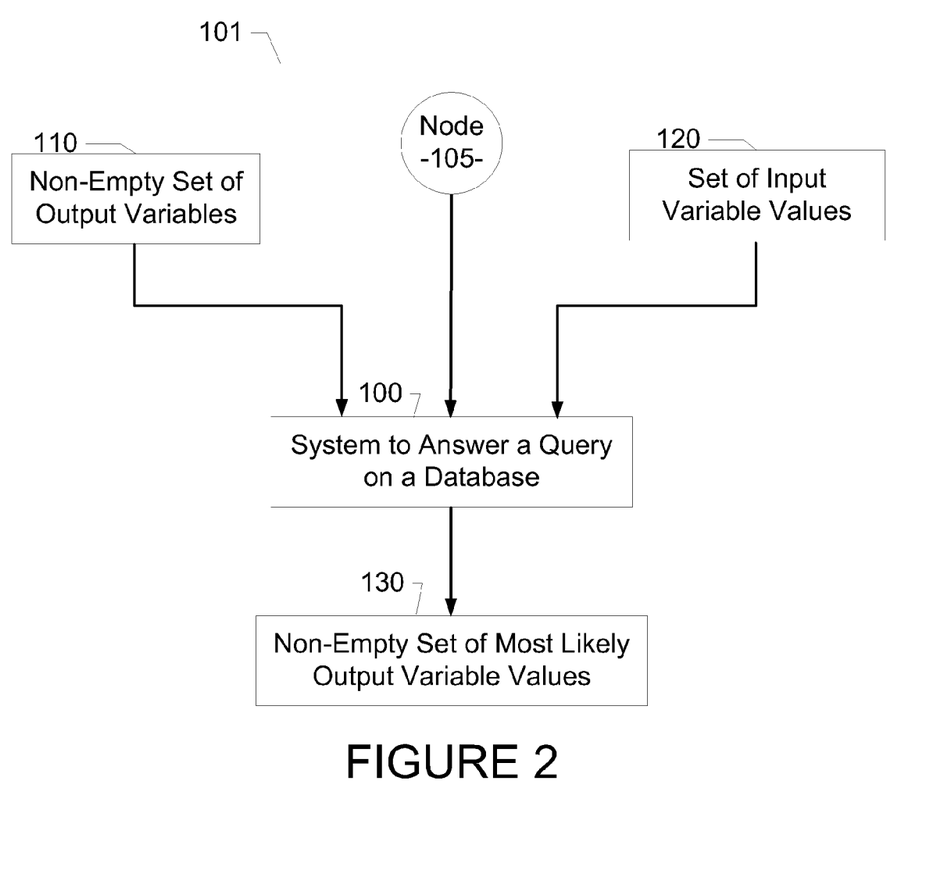
FIG. 2 illustrates an overall view of the processing performed by an example embodiment.

Referring now to FIG. 2, an overall view 101 illustrates the processing performed by an example embodiment. In an example embodiment as shown in FIG. 2, the database query processor 100 and its database query processor interface 162 receives input from a database query source 152. The received input can include a non-empty set of output variables 110, a set of input variable values 120, and a node 105. Nodes store information associated with the input and output variables in the form of a probability distribution function. Nodes can also store other information such as lower-bound or bounding box information for each variable. As described above, the node 105 can be identified with its associated node identifier.

For example, the database query processor 100 can receive a set of input variable values (e.g., x=2, y=7), a non-empty set of output variables (e.g., z), and a node identifier. Based on this sample input, the database query processor 100 can find values for the output variables (e.g., z=20) based on the input variable values, and the node. The output variable values 130 correspond to a set of rows from the database 166 that represent a match or a nearest match to the input variable values and the node.

As part of the database query processing performed by the database query processor 100 as described above in connection with FIG. 2, the database query processor 100 determines a cost based on the current node and the set of input variable values, wherein the cost corresponds to a probability of the input variable values based on the node. This cost determination processing 200 is illustrated in FIG. 3 and described below.

Figure 3:
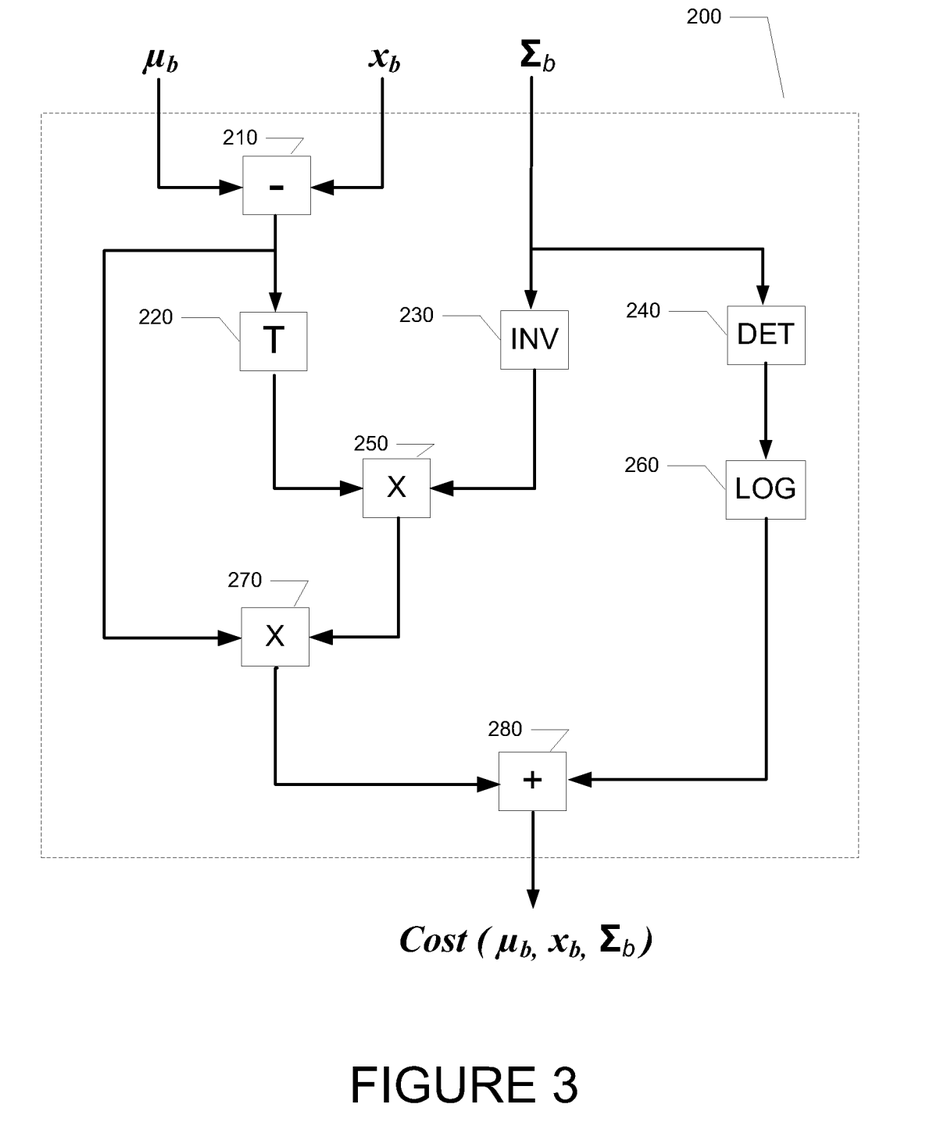
FIG. 3 illustrates an example embodiment of the cost determination processing in an example embodiment.

FIG. 3 illustrates an example embodiment of the cost determination processing 200. This processing is used to determine a cost at a leaf node. As input, the cost determination processing 200 receives three types of input in the example embodiment: $\mu_b$, $x_b$, and $\Box_b$. In the example illustrated in FIG. 3, the symbol $\mu_b$ represents a vector, which corresponds to the mean of the input variable values b. As described above, the database query processor 100 receives a set of input variable values 120 as an input. The mean of the input variable values b can be computed from the set of input variable values 120. The symbol $x_b$ shown in FIG. 3 is a vector, which corresponds to the input variable values b. Again, the database query processor 100 receives a set of input variable values 120 as an input. The symbol $\Box_b$ is matrix, which corresponds to a covariance matrix for the input variable values b.

As shown in FIG. 3, the difference between the input parameters, $\mu_b$ and $x_b$ is computed, transposed, and multiplied by the inversion of the $\Box_b$ matrix in multiplier 250. The transpose function (T) and the inversion function (INV) are common matrix operations. The product generated by multiplier 250 is multiplied by the difference between the input parameters, $\mu_b$ and $x_b$ in multiplier 270. The product generated by multiplier 270 is combined with the log of the determinant of the $\Box_b$ matrix in the adder 280. The determinant function (DET) is a common matrix operation. The log function (LOG) is a common mathematical operation. The result, as generated by adder 280 as shown in FIG. 3, is a computed cost estimate of the corresponding input values: $\mu_b$, $x_b$, and $\Box_b$ as produced by the cost determination processing 200 of the example embodiment shown in FIG. 3. The computed cost estimate can be used to determine the traversal costs for traversing a database tree from a first node to a second node.

Figure 4:
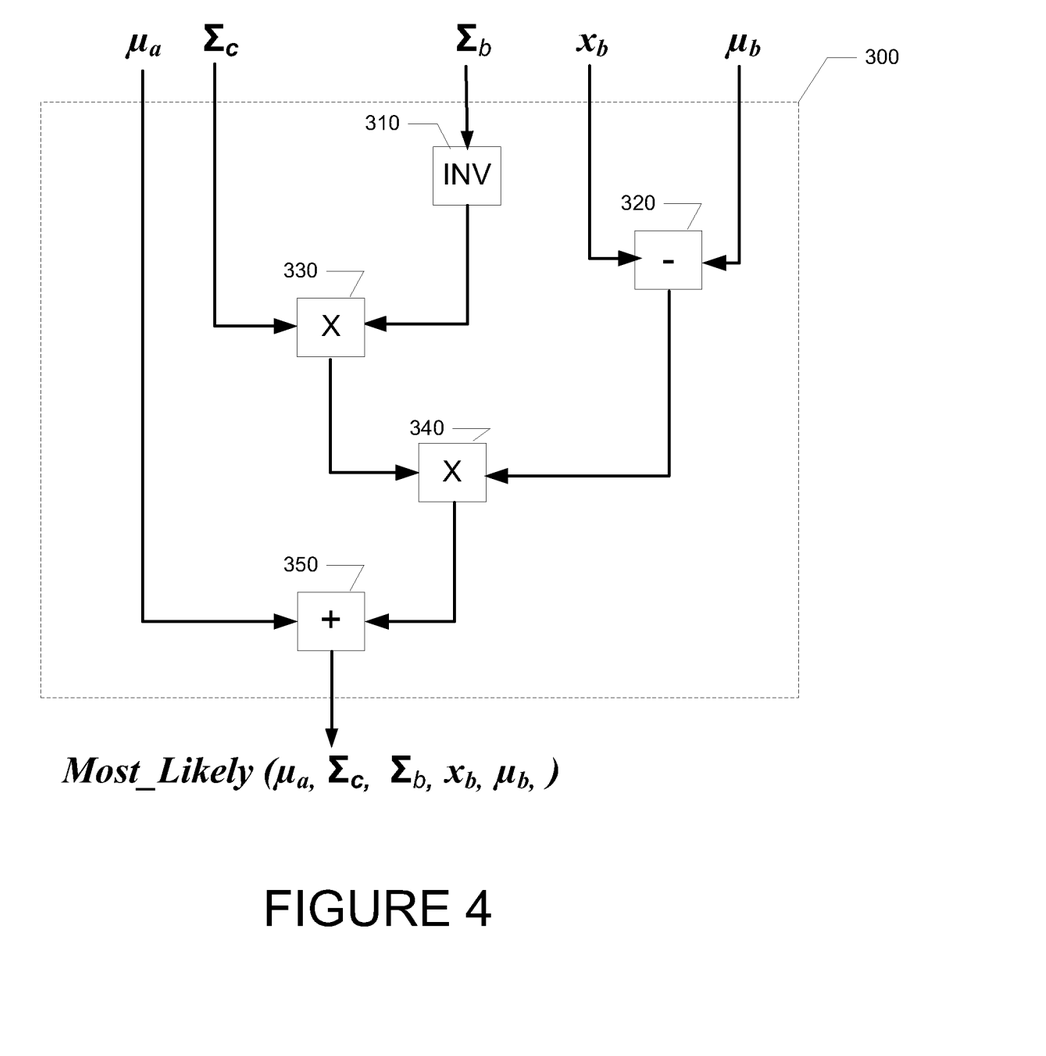
FIG. 4 illustrates an example embodiment of the processing used by the database query processor for determining a most likely non-empty set of output variable values at a leaf node.

FIG. 4 illustrates an example embodiment of the processing used by the database query processor 100 for determining a most likely non-empty set of output variable values at a leaf node. As input, the match determination processing 300 receives five types of input in the example embodiment: $\mu_a$, $\Box_c$, $\Box_b$, $x_b$, and $\mu_b$. In the example illustrated in FIG. 4, the symbol $\mu_a$ is a vector, which corresponds to the mean of the output variables a. As described above, the database query processor 100 receives a non-empty set of output variables 110 as an input. The mean of the output variables a can be computed from the non-empty set of output variables 110. The $\Box_c$ input is a matrix which corresponds to a covariance matrix between the output variables a and the input variables b. The input $\Box_b$ is a matrix, which corresponds to a covariance matrix between the input variables. The input $x_b$ is a vector, which corresponds to the input variable values b. The input $\mu_b$ is a vector, which corresponds to the mean of the input variables b.

As shown in FIG. 4, the difference between the inputs $x_b$ and $\mu_b$ is multiplied with the product of the input $\Box_c$ and the inverted matrix $\Box_b$. This result is combined with the input $\mu_a$ to produce a result corresponding to the most likely non-empty set of output variable values at a leaf node, which are associated with the input values.

The processing for determining a most likely non-empty set of output variable values as shown in FIG. 4 can be performed for each leaf node. However, efficiently traversing a database tree to get to the appropriate leaf nodes is also part of the embodiments disclosed herein. It is important to quickly converge on the portions of the database tree that are most likely to produce the best results. One technique for providing efficient convergence is to prune portions of the database tree that do not produce results that are likely to be a best match. In an example embodiment, a lower bound estimate based on a node can be computed and used to determine if the lower bound estimate exceeds a current pruning bound. If the lower bound estimate of a node exceeds a current pruning bound, the node can be considered a non-matching node and pruned from further processing. In particular, an example embodiment can determine a lower-bound estimate based on the node and the set of input variable values, wherein the lower-bound corresponds to an upper-bound probability estimate based on one or more of the nodes and the set of input variable values. Then, the example embodiment can determine whether or not the lower-bound estimate exceeds the current pruning bound. This comparison between the lower-bound estimate and the current pruning bound can be used to prune non-matching nodes and to quickly converge on nodes that are more likely to be matching or best matching.

Figure 5:
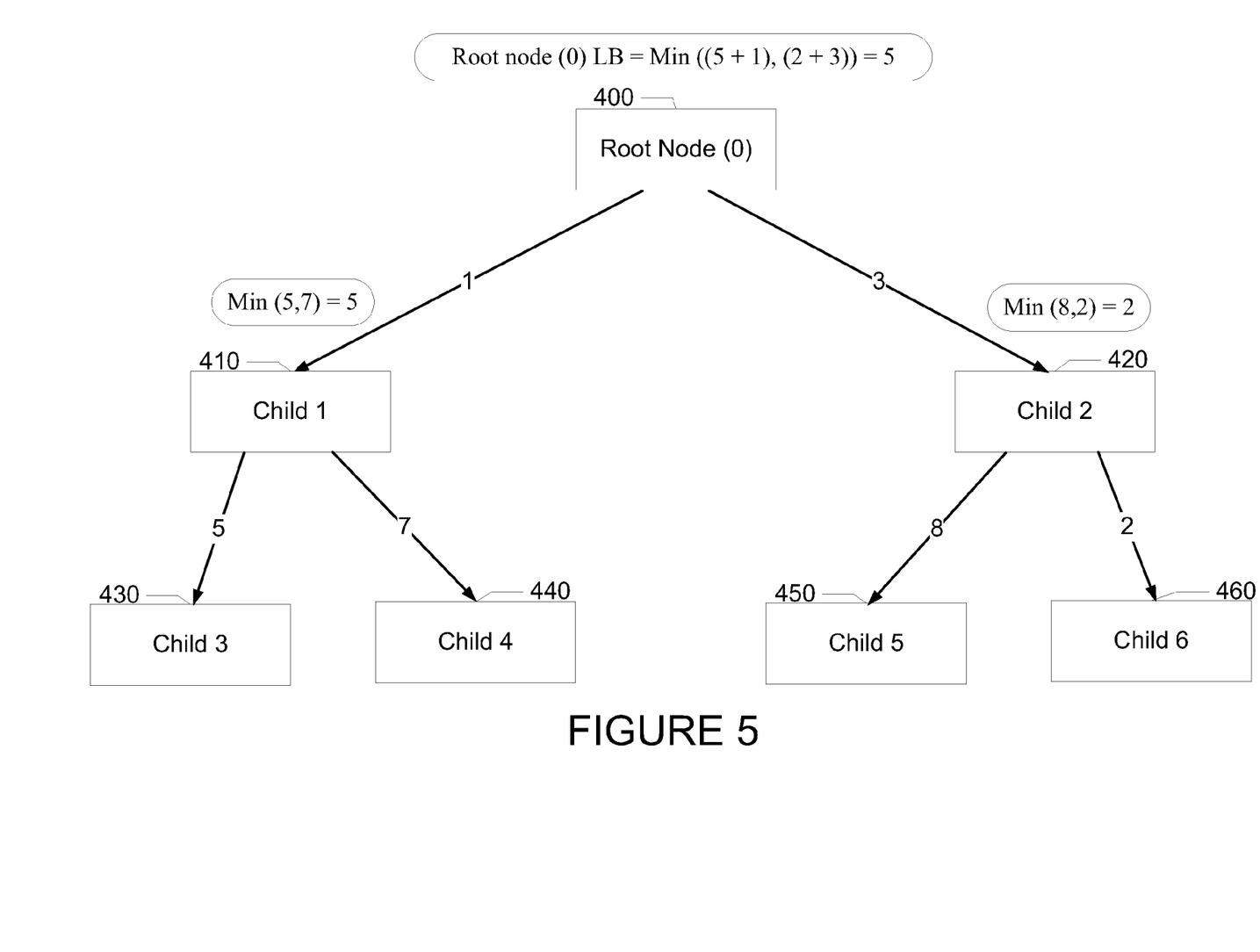
FIG. 5 illustrates an example of the database tree traversal processing of an example embodiment.

FIG. 5 illustrates an example of the database tree traversal processing of an example embodiment, wherein a lower-bound is stored at each node. As shown in FIG. 5, the number computed in the oval above each node with children corresponds to a lower-bound for the node. For example, the lower bound for Child 1 node 410, shown in FIG. 5, is computed by determining the minimum of the path costs for the children below the node 410. In this example, the lower bound for Child 1 node 410 is: 5=Min (5,7). The lower bound for Child 2 node 420, shown in FIG. 5, is computed by determining the minimum of the path costs for the children below the node 420. In this example, the lower bound for Child 2 node 420 is: 2=Min (8,2). Once the lower bounds for the child nodes are computed, the lower bound for the root node of the child nodes can be computed. The lower bound for the root node can be computed by determining the minimum of the lower bounds (LBs) of the child nodes below the root node added to the cost of traversing (TC) from the root node to the child nodes. In this example, the lower bound (LB) for the Root node (0) 400 is:

Root node (0) LB=Min((Child 1 LB+Child 1 TC), (Child 2 LB+Child 2 TC))

After substituting the numerical values shown in the example of FIG. 5 into the equation shown above, the lower bound (LB) for the Root node (0) 400 is:

Root node (0) LB=Min((5+1),(2+3))=5

By accurately computing the lower bound estimates for each node as described above, the lower bound estimates can be compared with a pruning bound to determine if a node and its children should be pruned as non-matching nodes. The process used in an example embodiment for traversing a database tree and using the computed lower bound estimates for accurate pruning is illustrated in FIGS. 6 through 8 and described in detail below.

Figure 6:
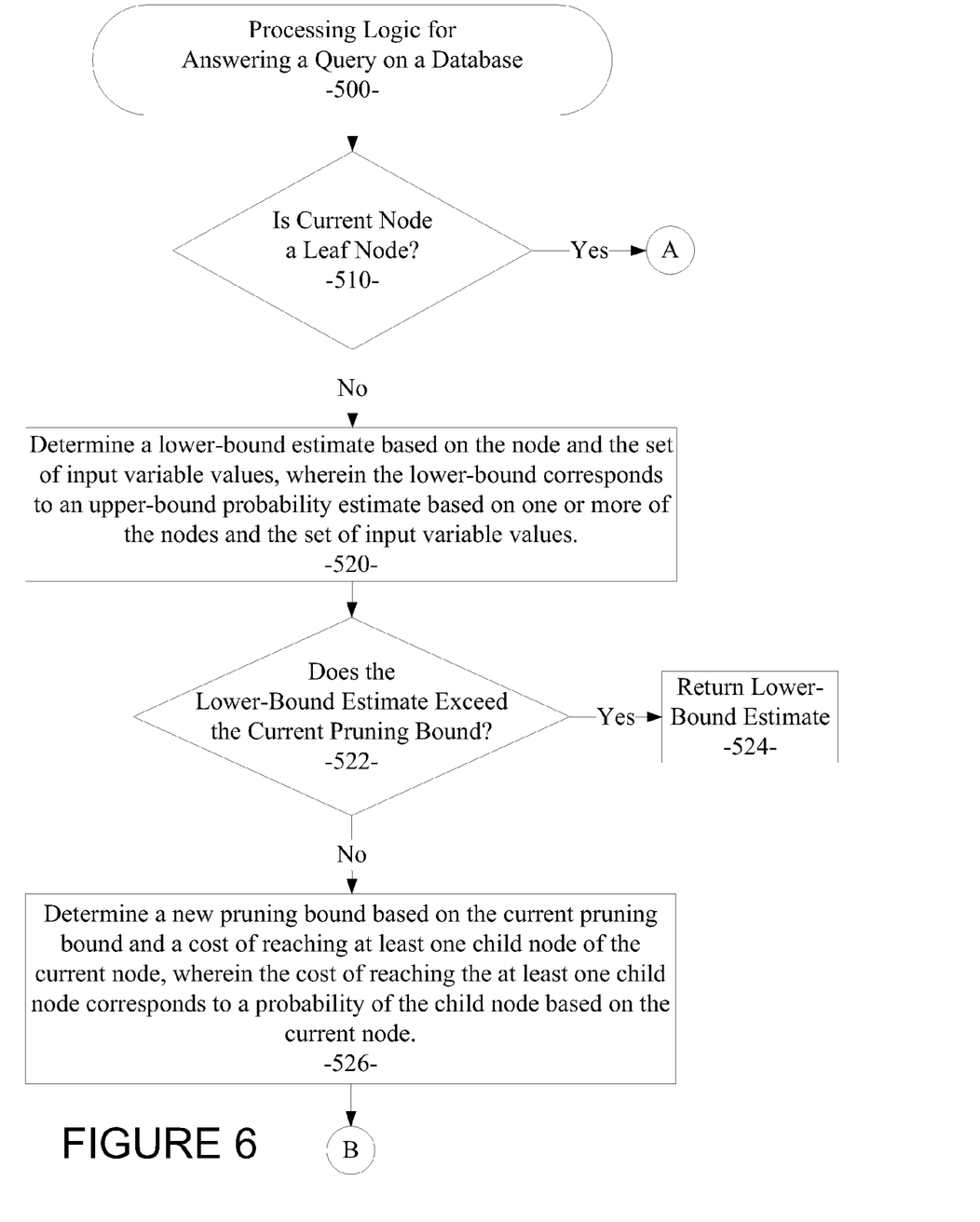
FIGS. 6-8 illustrate a flowchart showing the processing flow for answering a query on a database in an example embodiment.
Figure 7:
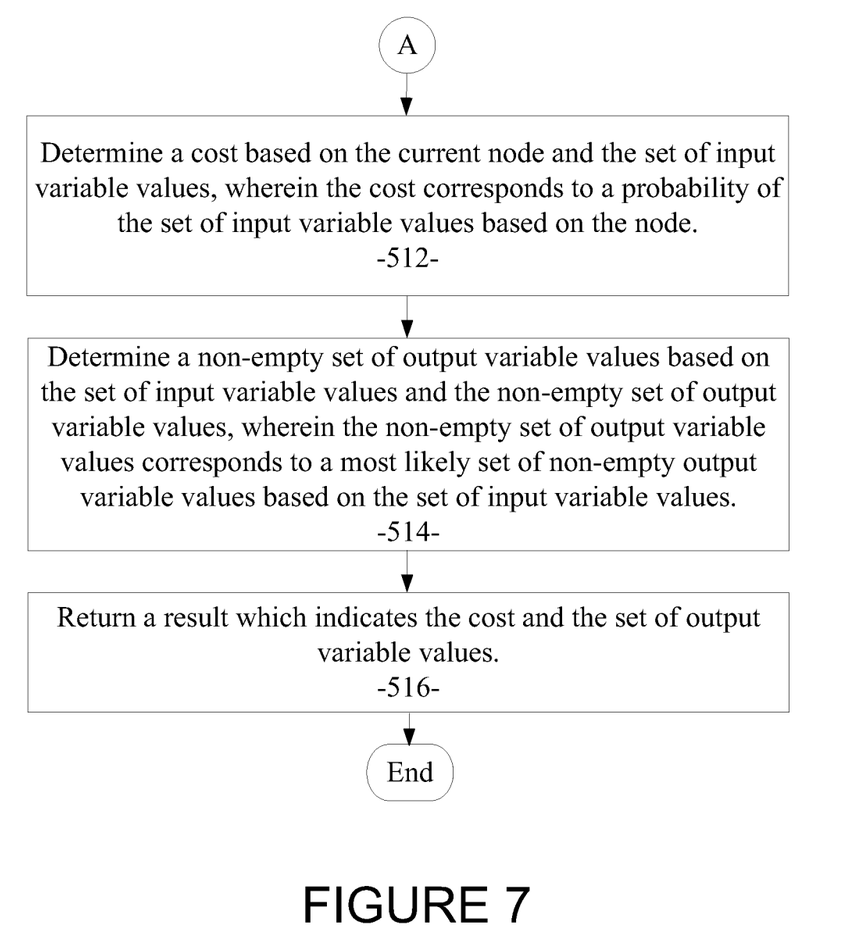
Figure 8:
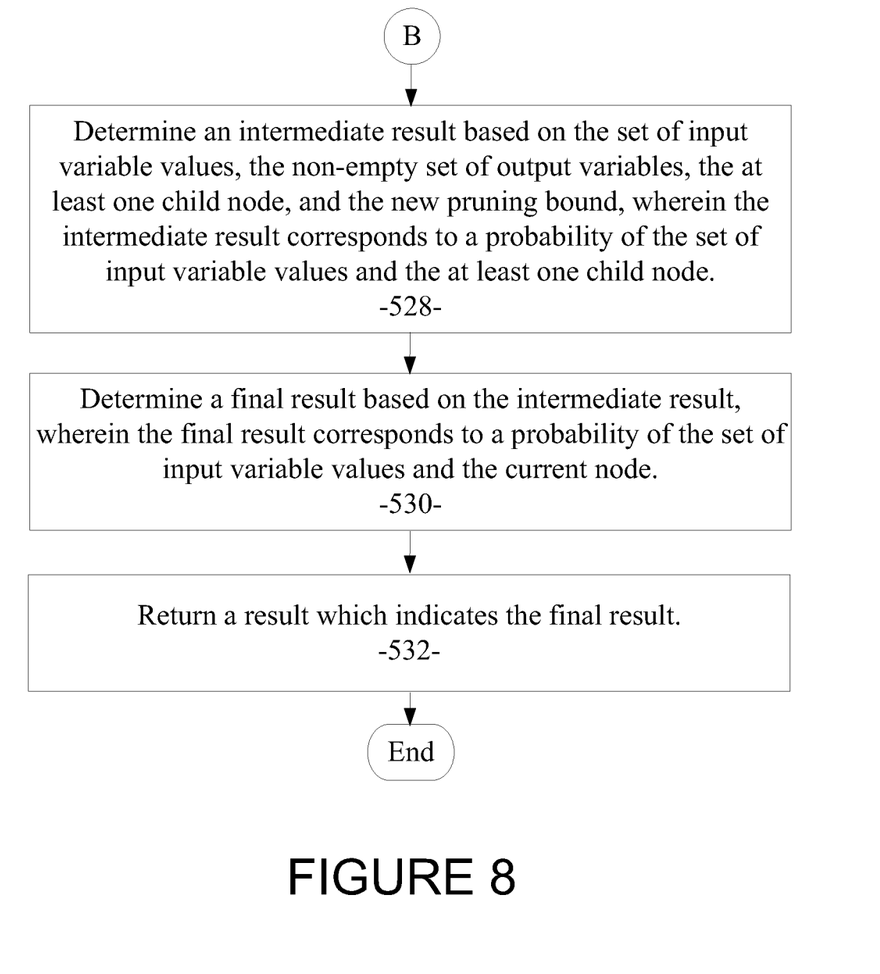

FIGS. 6 through 8 illustrate a flowchart showing the processing flow for answering a query on a database in an example embodiment. In the example embodiment, matching or near matching answers for the query are found by traversing a database tree and using the computed lower bound estimates for accurate pruning. The accurate pruning enables quick convergence on matching or near matching answers for the query. This processing flow for an example embodiment is described in detail below.

Referring to FIG. 6 at decision block 510, the current node is tested to determine if the current node is a leaf node. If the current node is a leaf node, processing continues at the bubble labeled A as shown in FIG. 7. If the current node is not a leaf node, processing continues at processing block 520. In processing block 520, processing is performed to determine a lower-bound estimate based on the node and the set of input variable values, wherein the lower-bound corresponds to an upper-bound probability estimate based on one or more of the nodes and the set of input variable values. The lower bound estimate is determined using the techniques described above. At decision block 522, the lower-bound estimate is tested to determine if the lower-bound estimate exceeds the current pruning bound. If the lower-bound estimate exceeds the current pruning bound, the lower-bound estimate is returned in processing block 524. If the lower-bound estimate does not exceed the current pruning bound, processing continues at processing block 526. In processing block 526, processing is performed to determine a new pruning bound based on the current pruning bound and a cost of reaching at least one child node of the current node, wherein the cost of reaching the at least one child node corresponds to a probability of the child node based on the current node. Processing then continues at the bubble labeled B as shown in FIG. 8.

Referring now to FIG. 7 at the bubble labeled A, it has been determined that the current node is a leaf node from the processing performed in decision block 510 shown in FIG. 6. In processing block 512, processing is performed to determine a cost based on the current node and the set of input variable values, wherein the cost corresponds to a probability of the set of input variable values based on the node. In processing block 514, processing is performed to determine a non-empty set of output variable values based on the set of input variable values and the non-empty set of output variable values, wherein the non-empty set of output variable values corresponds to a most likely set of non-empty output variable values based on the set of input variable values. Finally, in processing block 516, processing is performed to return a result which indicates the cost and the set of output variable values.

Referring now to FIG. 8 at the bubble labeled B, it has been determined that the lower-bound estimate does not exceed the current pruning bound from the processing performed in decision block 522 shown in FIG. 6. In processing block 528, processing is performed to determine an intermediate result based on the set of input variable values, the non-empty set of output variables, the at least one child node, and the new pruning bound, wherein the intermediate result corresponds to a probability of the set of input variable values and the at least one child node. In processing block 530, processing is performed to determine a final result based on the intermediate result, wherein the final result corresponds to a probability of the set of input variable values and the current node. Finally, in processing block 532, processing is performed to return a result, which indicates the final result.

Figure 9:
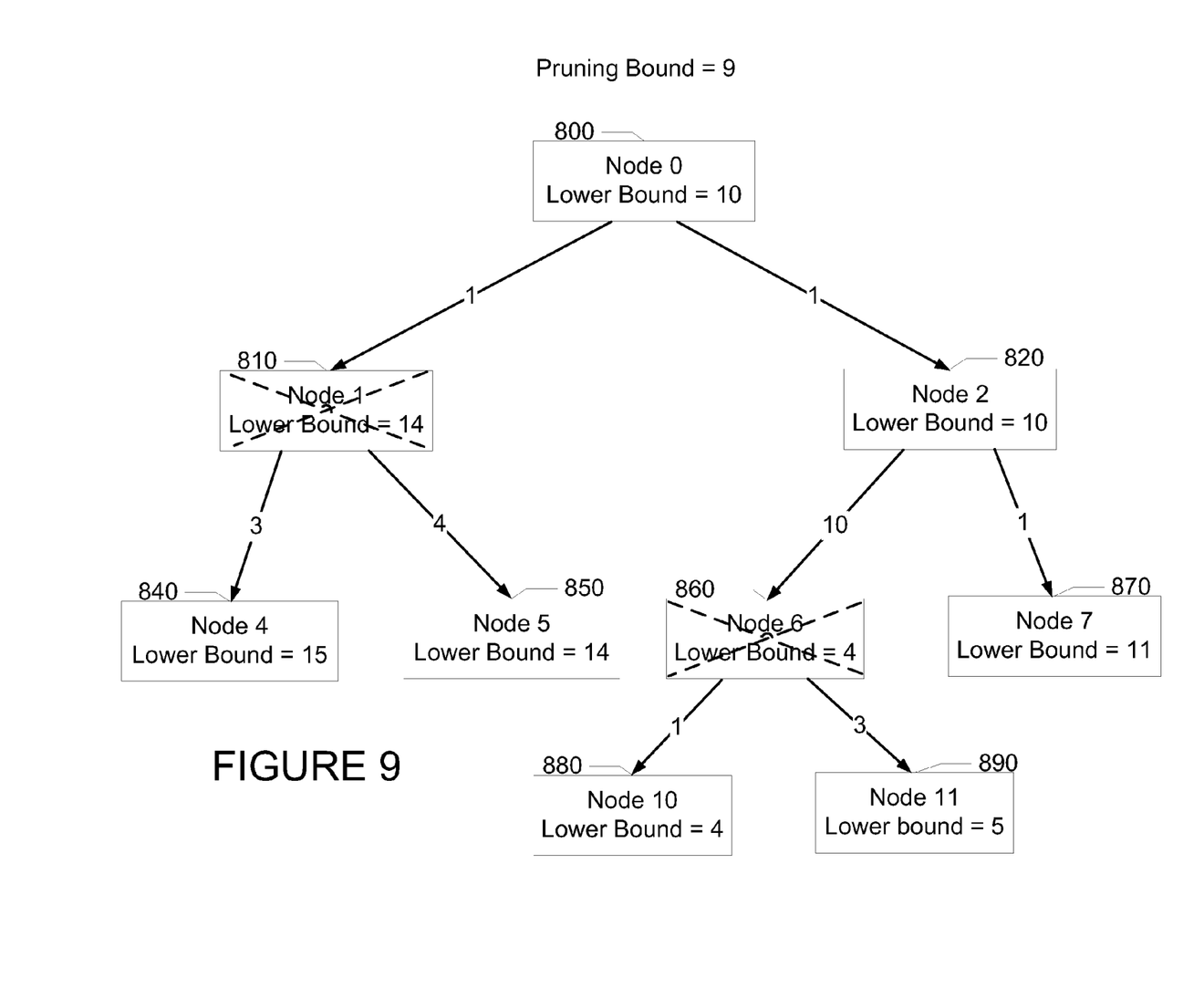
FIG. 9 illustrates an example embodiment of a sample database tree with computed lower bound estimates for each node.

FIG. 9 illustrates an example embodiment of a sample database tree with computed lower bound estimates for each node. The illustrated example embodiment represents of a sample portion of a database tree including nodes 0, 1-2, 4-7, and 10-11. Each node of the sample tree includes a lower bound value computed in the manner described above. In this sample tree as shown, a pruning bound value of 9 is given at the root node 0. The cost of traversing the sample tree from a first node to a second node is also shown in FIG. 9 as numeric values overlaying the arrows pointing between nodes. For example, the cost of traversing from node 0 to node 1 is 1; the cost of traversing from node 2 to node 6 is 10. These traversal cost values can be computed in the manner explained above.

In this sample tree as shown in FIG. 9, node 6 and its children can be pruned as indicated by the dashed diagonal slashes through Node 6. Node 6 can be pruned after determining that the computed pruning bound at Node 6 is 9−(1+ 10)=−2. This computed pruning bound at Node 6 is based on the given pruning bound at node 0 (pruning bound=9) from which is subtracted the cumulative cost of traversing from node 0 to node 6 (traversal cost=1+10). Because the lower bound at Node 6 (Node 6 lower bound=4) exceeds the computed pruning bound at Node 6 (−2), Node 6 and its children can be pruned.

In this sample tree as shown in FIG. 9, node 1 and its children can also be pruned as indicated by the dashed diagonal slashes through Node 1. Node 1 can be pruned after determining that the computed pruning bound at Node 1 is 9−1=8. This computed pruning bound at Node 1 is based on the given pruning bound at node 0 (pruning bound=9) from which is subtracted the cumulative cost of traversing from node 0 to node 1 (traversal cost=1). Because the lower bound at Node 1 (Node 1 lower bound=14) exceeds the computed pruning bound at Node 1 (8), Node 1 and its children can be pruned.

Once the nodes of the sample tree are pruned as explained above, a final result from the sample tree can be obtained by traversing the sample tree to a leaf node. In this sample tree as shown in FIG. 9, Node 7 is the remaining leaf node after Node 1 and Node 6 are pruned. A final result can be obtained by traversing the sample tree from the root node (Node 0) to the leaf node (Node 7). Thus, the final returned value is 1+1+ 11=13, which is obtained by following the rightmost path from Node 0 to Node 7 and summing the traversal costs ((Node 0 to Node 2=1)+(Node 2 to Node 7=1)) and adding the lower bound at the leaf node (lower bound at Node 7=11). Note that typically the minimum of all the children added to the traversal cost is the returned value at a node. Hence, in this sample tree as shown in FIG. 9, Node 1 (if not pruned) would return 1+14=15. Similarly, Node 6 (if not pruned) would return 10+4=14. Thus, as shown in the sample tree of FIG. 9, node lower bounds, traversal costs, and pruning bounds can be computed, nodes can be pruned, and a final result from the tree can be obtained by traversing the remaining tree to a leaf node. In this manner, the disclosed method and apparatus can facilitate answering a query on a database.

Figure 10:
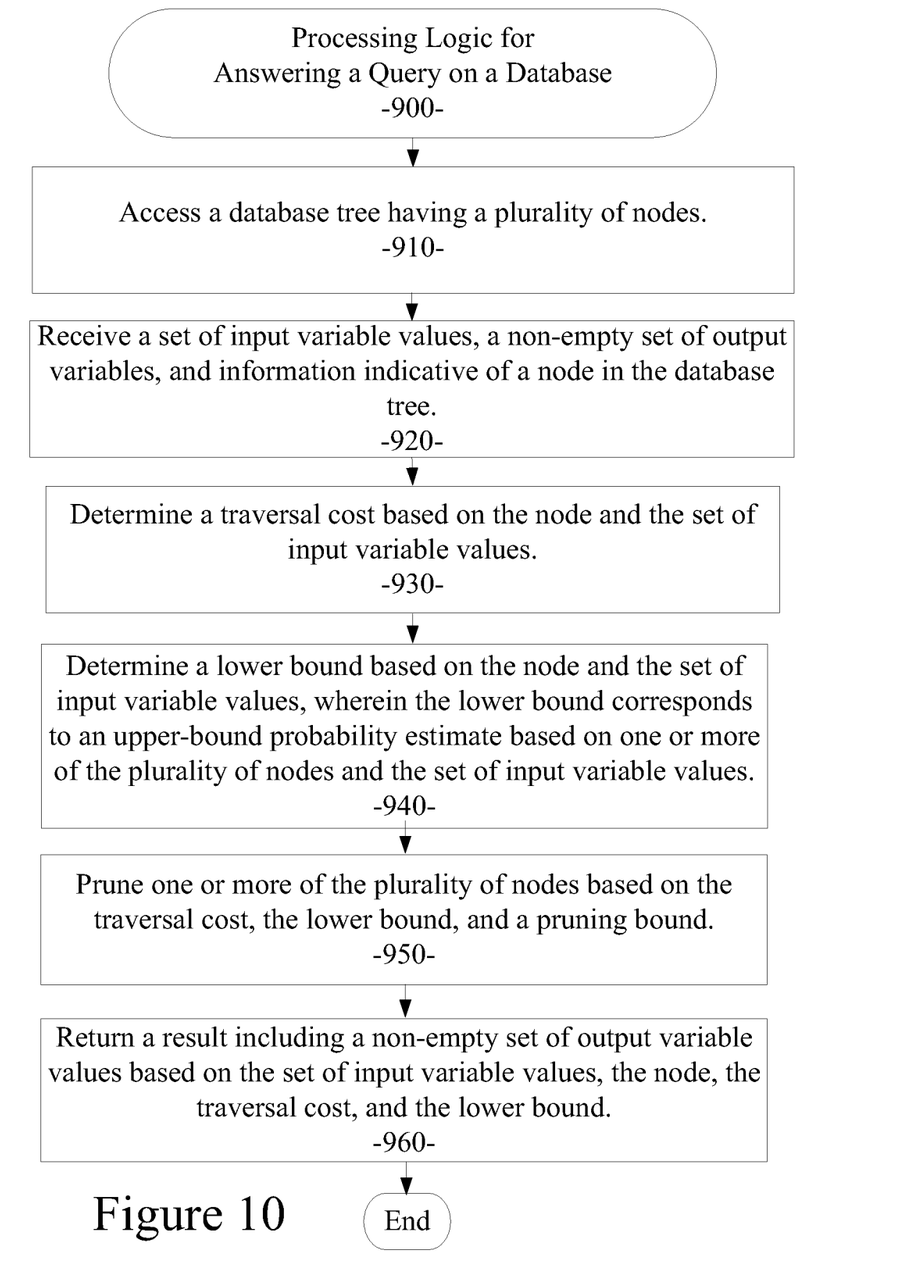
FIG. 10 illustrates a processing flow used in an example embodiment.

FIG. 10 illustrates a flowchart showing the processing flow for answering a query on a database in an example embodiment. Example embodiments include: accessing a database tree having a plurality of nodes (processing block 910); receiving a set of input variable values, a non-empty set of output variables, and information indicative of a node in the database tree (processing block 920); determining a traversal cost based on the node and the set of input variable values (processing block 930); determining a lower bound based on the node and the set of input variable values, wherein the lower bound corresponds to an upper-bound probability estimate based on one or more of the plurality of nodes and the set of input variable values (processing block 940); pruning one or more of the plurality of nodes based on the traversal cost, the lower bound, and a pruning bound (processing block 950); and returning a result including a non-empty set of output variable values based on the set of input variable values, the node, the traversal cost, and the lower bound (processing block 960).

Figure 11:
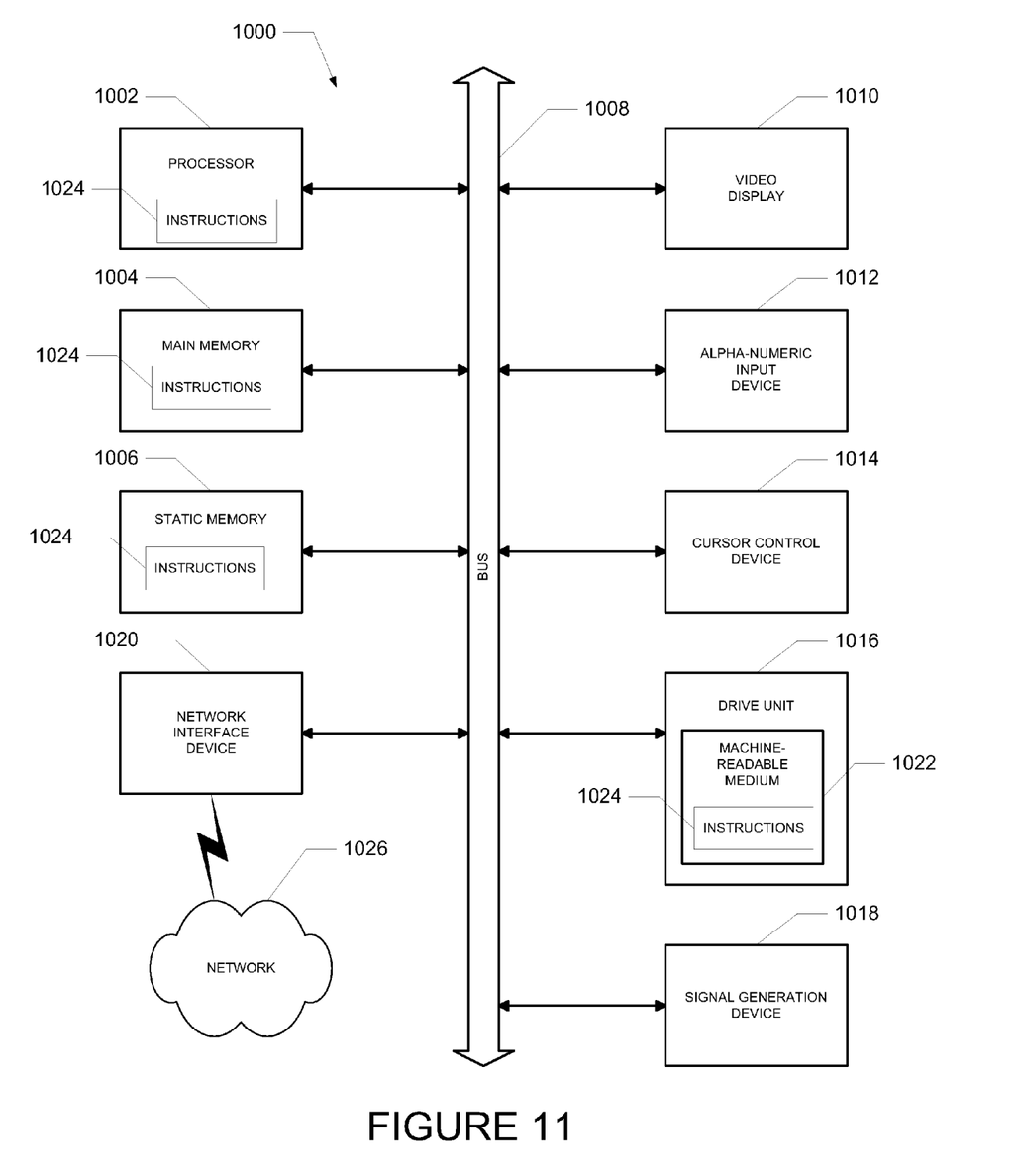
FIG. 11 shows a diagrammatic representation of a machine in the example form of a computer system.

FIG. 11 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media, and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and apparatus for facilitating answering a query on a database have been described. Although embodiments have been described with reference to specific example embodiments, it will be evident that various modifications and changes may be made to these embodiments without departing from the broader spirit and scope of embodiments as expressed in the subjoined claims.

What is claimed is:

1. A method comprising:
   accessing a database tree having a plurality of nodes, the database tree being a probabilistic tree;
   receiving a set of input variable values, a non-empty set of output variables, and information indicative of a node in the database tree;
   determining, by use of a processor, a traversal cost based on the node and the set of input variable values;
   determining, by use of the processor, a lower bound for the traversal cost based on the node and the set of input variable values, wherein the lower bound corresponds to an upper-bound probability estimate based on one or more of the plurality of nodes and the set of input variable values, wherein the upper-bound probability estimate corresponds to an upper-bound on a probability of selecting the node;
   pruning one or more of the plurality of nodes based on the traversal cost, the lower bound, and a pruning bound; and
   returning a result including a non-empty set of output variable values based on the set of input variable values, the node, the traversal cost, and the lower bound.

2. The method of claim 1 wherein the non-empty set of output variable values corresponds to a most likely set of non-empty output variable values based on the set of input variable values.

3. The method of claim 1 wherein the node is not a leaf node.

4. The method of claim 1 wherein the pruning bound is based on a cost of reaching at least one child node of the node.

5. The method of claim 1 wherein each of the plurality of nodes is associated with a probability distribution function corresponding to one or more rows in a database.

6. The method of claim 5 wherein the probability distribution function comprises a mean vector and a covariance matrix.

7. The method of claim 1 wherein the set of input variable values and the non-empty set of output variables correspond to a database query.

8. A system comprising:
   a processor;
   a database query processor interface, in data communication with the processor, to receive a database query comprising a set of input variable values, a non-empty set of output variables, and information indicative of a node in a database tree, the database tree being a probabilistic tree; and
   a database query processor, in data communication with the processor, to:
     access the database tree having a plurality of nodes;
     determine a traversal cost based on the node and the set of input variable values;
     determine a lower bound for the traversal cost based on the node and the set of input variable values, wherein the lower bound corresponds to an upper-bound probability estimate based on one or more of the plurality of nodes and the set of input variable values, wherein the upper-bound probability estimate corresponds to an upper-bound on a probability of selecting the node;
     prune one or more of the plurality of nodes based on the traversal cost, the lower bound, and a pruning bound; and
     return a result including a non-empty set of output variable values based on the set of input variable values, the node, the traversal cost, and the lower bound.

9. The system of claim 8 wherein the non-empty set of output variable values corresponds to a most likely set of non-empty output variable values based on the set of input variable values.

10. The system of claim 8 wherein the node is not a leaf node.

11. The system of claim 8 wherein the pruning bound is based on a cost of reaching at least one child node of the node.

12. The system of claim 8 wherein each of the plurality of nodes is associated with a probability distribution function corresponding to one or more rows in a database.

13. The system of claim 12 wherein the probability distribution function comprises a mean vector and a covariance matrix.

14. The system of claim 8 wherein the set of input variable values and the non-empty set of output variables correspond to a database query.

15. An article of manufacture comprising a non-transitory machine-readable storage medium having machine executable instructions embedded thereon, which when executed by a machine, cause the machine to:
   access a database tree having a plurality of nodes, the database tree being a probabilistic tree;
   receive a set of input variable values, a non-empty set of output variables, and information indicative of a node in the database tree;
   determine a traversal cost based on the node and the set of input variable values;
   determine a lower bound for the traversal cost based on the node and the set of input variable values, wherein the lower bound corresponds to an upper-bound probability estimate based on one or more of the plurality of nodes and the set of input variable values, wherein the upper-bound probability estimate corresponds to an upper-bound on a probability of selecting the node;

prune one or more of the plurality of nodes based on the traversal cost, the lower bound, and a pruning bound; and return a result including a non-empty set of output variable values based on the set of input variable values, the node, the traversal cost, and the lower bound.

16. The article of manufacture of claim 15 wherein the non-empty set of output variable values corresponds to a most likely set of non-empty output variable values based on the set of input variable values.

17. The article of manufacture of claim 15 wherein each of the plurality of nodes is associated with a probability distribution function corresponding to one or more rows in a database.

18. The article of manufacture of claim 17 wherein the probability distribution function comprises a mean vector and a covariance matrix.

* * * * *